July 23, 1968     J. F. KELLY ETAL     3,393,927
ELECTRICAL CONNECTOR
Filed Feb. 7, 1966
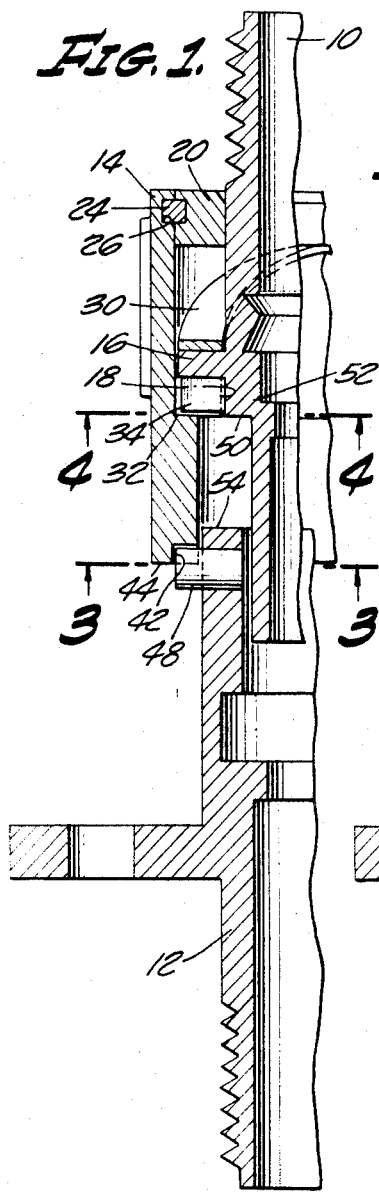
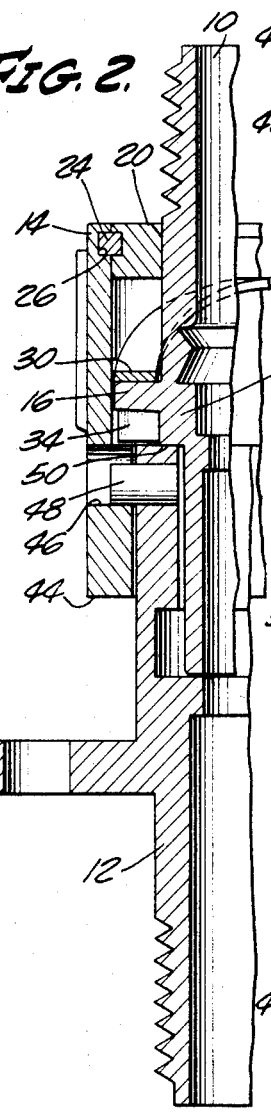
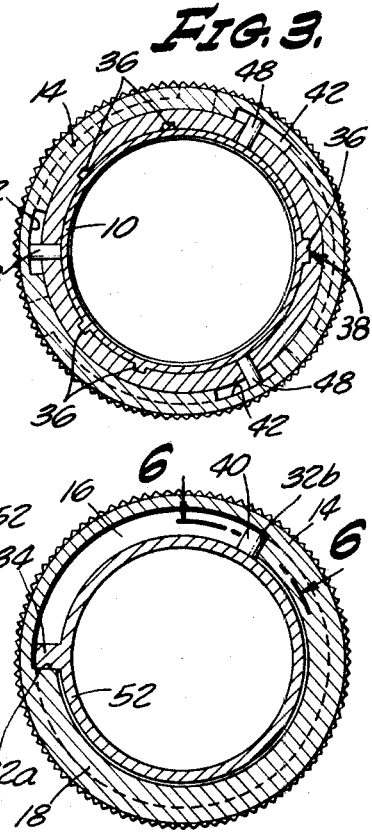
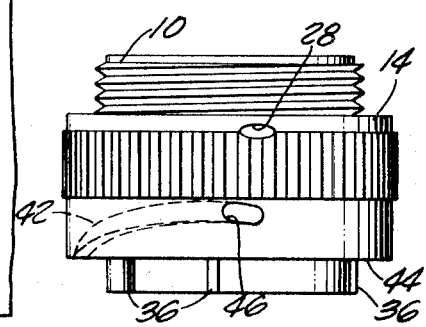
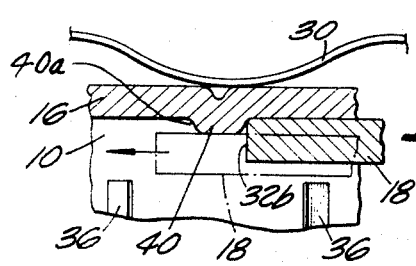
JOSEPH F. KELLY
MICHAEL E. McCREA
INVENTORS.
BY Gordon H. Olson
ATTORNEY

United States Patent Office 3,393,927
Patented July 23, 1968

3,393,927
ELECTRICAL CONNECTOR
Joseph F. Kelly, Huntsville, Ala., and Michael Eugene McCrea, Glendale, Calif., assignors to International Telephone and Telegraph Corporation, a corporation of Delaware
Filed Feb. 7, 1966, Ser. No. 525,522
4 Claims. (Cl. 285—23)

ABSTRACT OF THE DISCLOSURE

A first connector part has a cylindrical portion with longitudinally extending splines for reception within mating grooves of a second connector part. A coupling that is rotatably secured on the first connector part has internal helical grooves for threadingly receiving extensions on the second part. Means are provided between the coupling and said first connector part for releasably holding the coupling in proper angular position on said first part for immediate engagement with the second connector part.

---

This invention relates to improvements in a separable electrical connector of the type including two outer casing members coupled together by a rotatable nut, which is captivated on one of the casing members when separated from the other casing member.

In one such type of connector it is necessary that the two casing members and the nut be properly oriented to be connected and it is desirable that the nut be automatically positioned properly for connection whenever the connector is uncoupled. Such connectors are precision components normally utilized in conjunction with expensive electrical equipment. It is thus desirable that the connector be not only convenient to operate, but that it also be highly reliable and tamper proof.

Accordingly, it is a general object of this invention to provide a connector of the above-mentioned type having an improved rugged construction, which is easy to manufacture and assemble.

It is a further object of this invention to provide an improved connector of this type which is very stable and reliable in operation and is readily adaptable to be fabricated in a variety of sizes.

According to the principal aspect of the present invention, there is provided an electrical connector of the type including two outer casing members coupled together by a coupling captivated on one of the casing members when separated from the other casing member. Means are provided for releasably holding the coupling in proper angular position on said one casing member for immediate engagement to the other casing member whenever the parts are separated and for drawing the connector casings together and locking them in coupled relationship. Such means is internally located in the connector so as to be tamper-proof and not subject to damage due to dust or dirt in the environment surrounding the connector.

Further features, objects and advantages will become apparent with reference to the following drawing in which:

FIG. 1 is an elevational, sectional view of one portion of the coupling of the invention with the components shown in position to be connected;

FIG. 2 shows the coupling of FIG. 1 in fully connected position;

FIG. 3 is a cross-sectional view along line 3—3 in FIG. 1 showing the entire coupling cross-section;

FIG. 4 is a cross-sectional view along line 4—4 in FIG. 1 showing the entire coupling cross-section;

FIG. 5 is a side elevational view of the nut and one coupling member of the invention; and FIG. 6 is an enlargement of a portion of the invention taken on line 6—6 of FIG. 4.

Turning now to the drawing, the coupling of the invention is seen to include a first casing forming a cylindrical shell 10 and a second mating cylindrical casing 12 surrounding a portion of shell 10 and connected by a rotatable nut 14 surrounding the two casings. The two casings are adapted to receive mating conductor terminals mounted in suitable insulation, none of which is shown in that it is not necessary to obtain an understanding of the invention.

The shell 10 is formed with an outwardly extending flange 16 with an outer diameter greater than the inner diameter of an inwardly extending shoulder 18 formed on nut 14. The interference between the flange and the shoulder limit the relative movement between shell 10 and nut 14.

A rigid annular ring 20 is snugly positioned between the nut and the shell with the flange between the ring and shoulder 18. The ring is formed with an annular groove 22 on its exterior surface having a generally rectangular cross-section. It is desired that the ring be secured to the nut so that it serves to limit axial movement of the nut relative to the shell. For this purpose, there is provided a retaining wire 24 extending through a groove 26 formed on the inner surface of the nut spaced from the shoulder 18. As can be seen, the groove 26 has a rectangular cross-section generally similar to groove 22, and wire 24 has a square or rectangular cross-section to mate with the grooves. In assembly, the wire is inserted into the grooves through a passage 28 (FIG. 5) leading from groove 26 to the exterior of the nut.

For urging the flange 16 into engagement with shoulder 18, there is employed a resilient, axially compressible wave spring 30 between shell 10 and nut 14 with one end engaging the lower surface of ring 20 and the other end engaging the top bearing surface of flange 16. Thus, it can be seen that with this arrangement the nut 14 is securely although resiliently coupled to the shell 10 for limited axial movement. Rigid ring 20 provides a strong, rugged surface for receiving the axial thrust of spring 30 and the close fit between the ring and the casing members 10 and 12 effectively prevents dust and dirt particles from entering the assembly.

The nut is, of course, mounted for rotation on the shell. Also, however, it is desired that the movement of the nut be limited between two extreme arcuate positions. In one position, the nut is aligned to receive casing member 12; and in a second extreme position, the casing member 12 is fully assembled to casing 10 by means of the nut 14. To perform the rotation limiting function, a section of the nut shoulder 18 is relieved to form an arcuate track 32 having vertical end surfaces 32a and 32b, see FIG. 4. A stop 34 depending from the lower surface of flange 16 rides within track 32 so that the engagement of stop 34 with end surface 32a or 32b limits the rotational movement of the nut 14 relative to casing shell 10. Note that the stop 34 has considerable axial length, and thus cannot be forced out of track 32 by rotational force. Also, since the stop is formed integrally with flange 16 and has substantial bulk it cannot be easily sheared or deformed by a high torque applied to the nut Casing members 10 and 12 are of the polarized variety and hence must be properly rotationally aligned to permit axial coupling. For this purpose, the member 10 is provided with a plurality of axially extending ribs 36 which mate with axially extending grooves 38 formed on the interior of casing member 12 as shown in FIG. 3. Since the casing members must be properly oriented to permit axial coupling, it is desirable that nut 14 be positioned on member 10 to receive member 12 whenever member 10 is not coupled to such a casing member. Nut 14 is shown in such position in FIGS. 1 and 4 wherein stop 34 is engaging track surface 32a. To hold the nut in this position, there is provided an additional detent or lug 40 depending from the lower surface of flange 16 and engaging track end surface 32b, as shown in FIGS. 4 and 6. Thus, nut 14 is locked in that position by force of spring 30 and the engagement of lug 40 and stop 34 with the end surfaces of arcuate track 32. The nut 14 may be released from this locked position by rotating the nut so that the sloping cam surface 40a of lug 40 engages track end surface 32b forcing the nut and shell to be moved axially so that the lower surface of lug 40 slides in contact with shoulder 18. That is, nut 14 is rotated in a counter clockwise direction relative to shell 10, as viewed in FIG. 4 to assume the phantom position shown in FIG. 6. The nut may be moved in this fashion as member 12 is axially coupled to member 10. That is, the alignment and partial engagement of ribs 36 and grooves 38 prevent rotation between casing members 10 and 12, and rotational force applied to nut 14 causes the described interaction between shoulder 18 and lug 40.

Nut 14 is further formed with three internal helical grooves 42 (FIG. 5) having their entrances at the end surface 44 of nut 14 and terminating in openings 46 in the side wall of the nut. Three projections 48 formed on the side wall of member 12 are adapted to be received in spiral grooves 42. The projections 48 are arcuately located with respect to grooves 38, and the ribs 36 are in turn oriented with spiral grooves 42 in nut 14 such that when the ribs 36 and grooves 38 are aligned, the projections 48 are positioned to be received in grooves 42. Thus, by rotating the nut, the interaction of projections 48 and grooves 42 causes the nut and member 10 to be axially drawn toward member 12.

During the initial portion of this movement, after shoulder 18 is riding on lug 40, the spring 30 is not further axially compressed. However, the sliding friction between spring 30 and ring 20 requires noticeable torque to rotate the nut. As the nut and shell member 10 are moved axially downwardly, as seen in FIG. 2, the lower surface 50 of annular abutment 52 on member 10 eventually engages the upper surface 54 on member 12 and further rotational and downward axial movement of nut 14 further compresses spring 30 a slight amount. Also, this action moves shoulder 18 away from lug 40, thus relieving stress between shoulder 18 and flange 16. When the fully coupled position is reached, the spring force causes projections 48 to snap into openings 46 and stop 34 approaches track end surface 32b.

Note from FIG. 5 that the extreme end of opening 46 is slightly lower than the adjacent portion of the opening and groove 42 so that the nut is allowed to move upwardly slightly and thus be locked in position by projection 48 due to the urging of spring 30.

From the foregoing description, it can be seen that the coupling of the invention provides the desired indexing and locking of the nut relative to the casing members with a unique and simplified construction that is rugged, accurate and reliable. With the indexing and locking features formed integrally with the nut and casing shell as described, the structure is very strong and not subject to external tampering.

While only a single embodiment of the invention is illustrated, it will be understood that various modifications and changes may become apparent in the light of the disclosure; and it is intended that the appended claims include such variations that fall within the scope of the invention.

What is claimed is:
1. A connector comprising: a generally cylindrical shell having a radially outwardly extending integral rigid circumferentially extending flange; an annular coupling nut surrounding said shell and having a radially inwardly extending circumferential shoulder disposed at one side of said flange, said shoulder having an inner surface defining a diameter smaller than the outer diameter of the flange so that axial movement of the nut relative to the shell is limited in one direction; an annular rigid circumferentially continuous ring releasably secured to said nut at the other side of said flange, said ring being spaced from said flange and snugly fitting against said shell and said nut without preventing relative axial movement between the nut and shell; resilient means in axial compression held between said ring and said flange; and means formed on said flange and said shoulder for limiting relative rotation of the nut and the shell between two extreme arcuate positions and including means for releasably locking said nut and shell in one extreme position, said locking means being held in locked position by the axial force of said resilient means and movable into unlocked position by relative axial movement of said nut and shell to further compress said resilient means and means formed on said inner surface of said shoulder of said nut for arcuately and axially receiving another connector member to be coupled to said nut and shell; and means formed on said shell for axially and arcuately aligning said other connector to be properly received within said nut, said receiving means being properly positioned when arcuately locked by said locking means.

2. The invention of claim 1 wherein said ring has an annular groove in its outer periphery; means defining an annular groove in the inner wall of said nut spaced from said shoulder on the side of said flange opposite from the shoulder and having a cross section similar to the groove in said ring; a retaining wire snugly positioned in said grooves to prevent axial movement of said ring relative to said nut and whereby axial movement of the nut relative to the shell is limited in the direction opposite to said one direction; and a passage leading from said grooves to the exterior of said nut for insertion of said wire in said grooves.

3. The invention of claim 2, wherein said grooves and said wire have rectangular cross sections.

4. The invention of claim 1 in which said rotation limiting means comprises a stop depending from said flange toward said shoulder and an arcuate track formed in said shoulder receiving said lug; and said locking means includes a lug depending from said flange which rides on said shoulder until arcuately aligned with said track, whereupon it is axially snapped into said track by said resilient means, said stop and said lug being arcuately spaced a distance equal to the arcuate length of said track so that the lug and the stop prevent relative rotation of the nut and shell when the lug and stop are within the track.

References Cited
UNITED STATES PATENTS

| | | | |
|---|---|---|---|
| 793,869 | 7/1905 | Anderson | 285—330 |
| 1,899,119 | 2/1933 | Singer | 285—359 |
| 2,961,630 | 11/1960 | Duncan | 339—90 |
| 2,984,811 | 5/1961 | Hennessey et al. | 339—90 X |
| 3,202,956 | 8/1965 | Hennessey | 285—396 X |

FOREIGN PATENTS

| | | |
|---|---|---|
| 652,986 | 5/1951 | Great Britain. |

EDWARD C. ALLEN, Primary Examiner.

DAVE W. AROLA, Assistant Examiner.